United States Patent [19]

Otto

[11] Patent Number: 4,468,844
[45] Date of Patent: Sep. 4, 1984

[54] MECHANICAL SURFACE FINISHING PROCESS FOR TEXTILE FABRIC

[75] Inventor: Wolfgang K. F. Otto, Spartanburg, S.C.

[73] Assignee: Milliken Research Corporation, Spartanburg, S.C.

[21] Appl. No.: 282,446

[22] Filed: Jul. 13, 1981

Related U.S. Application Data

[63] Continuation-in-part of Ser. No. 92,815, Nov. 9, 1979, Pat. No. 4,316,928.

[51] Int. Cl.³ ........................................... D06C 11/00
[52] U.S. Cl. ..................................... 26/28; 26/29 R; 26/37; 28/100; 28/103
[58] Field of Search ................. 26/1, 25, 27, 28, 29 R, 26/30, 37; 28/100, 103

[56] References Cited

U.S. PATENT DOCUMENTS

| | | |
|---|---|---|
| 394,747 | 12/1888 | Wolcott . |
| 509,296 | 11/1893 | Brown ..................................... 26/25 |
| 702,118 | 6/1902 | Spindler . |
| 1,453,742 | 5/1923 | Browning . |
| 1,555,865 | 10/1925 | McConnell ............................ 26/27 |
| 1,573,645 | 2/1926 | Mason . |
| 2,566,075 | 8/1951 | Taylor et al. . |
| 2,720,064 | 10/1955 | Klug . |
| 2,754,565 | 7/1956 | Hadley . |
| 2,970,362 | 2/1961 | Rankin et al. . |
| 3,124,844 | 3/1964 | Constantine et al. ............... 26/28 X |
| 3,229,346 | 1/1966 | Hadley .................................... 26/28 |
| 3,523,346 | 8/1970 | Bolen et al. . |
| 3,553,801 | 1/1971 | Hadley . |
| 3,592,732 | 7/1971 | Wand .................................. 26/27 X |
| 3,600,861 | 8/1971 | Haywood . |
| 3,645,049 | 2/1972 | Freerks et al. . |
| 3,706,167 | 12/1972 | Schaffner . |
| 3,795,498 | 3/1974 | Hasegawa . |
| 3,872,557 | 3/1975 | Benzaquen ............................. 26/28 |
| 3,872,630 | 3/1975 | All . |
| 3,890,119 | 6/1975 | Schaffner . |
| 3,894,318 | 7/1975 | Ito et al. ................................ 26/28 |
| 3,973,359 | 8/1976 | Spencer et al. ..................... 26/28 X |
| 4,012,815 | 3/1977 | Benzaquen ............................. 26/28 |
| 4,316,928 | 2/1982 | Otto ....................................... 26/28 |

FOREIGN PATENT DOCUMENTS

| | | |
|---|---|---|
| 0016939 | 10/1980 | European Pat. Off. . |
| 270788 | 2/1914 | Fed. Rep. of Germany .......... 26/27 |
| 369061 | 3/1939 | Italy .................................... 26/29 R |
| 102523 | 12/1923 | Switzerland ........................... 26/25 |
| 1190 | of 1855 | United Kingdom .................... 26/37 |
| 612427 | 11/1948 | United Kingdom . |
| 935228 | 8/1963 | United Kingdom . |
| 1154829 | 6/1969 | United Kingdom . |
| 1171170 | 11/1969 | United Kingdom . |
| 1528524 | 10/1978 | United Kingdom . |

*Primary Examiner*—Robert Mackey
*Attorney, Agent, or Firm*—H. William Petry; Terry T. Moyer

[57] ABSTRACT

A process is provided for mechanically surface-finishing a textile fabric which comprises continuously feeding said fabric from an empty source of supply, such that said fabric lies in a single plane, subjecting successive adjacent sections of the fabric to intermittent mechanical impact with an abrasive means across the width of said fabric thereby avoiding substantial sustained contact between the fabric and the abrasive means, the mechanical impact being at a force and frequency sufficient to cause a substantially uniform modification of the surface characteristics of the fabric. Textile fabrics with modified surface which may be made by the above process are also provided. Apparatus for mechanically surface-finishing a textile fabric according to the aforedescribed process is further provided.

8 Claims, 52 Drawing Figures

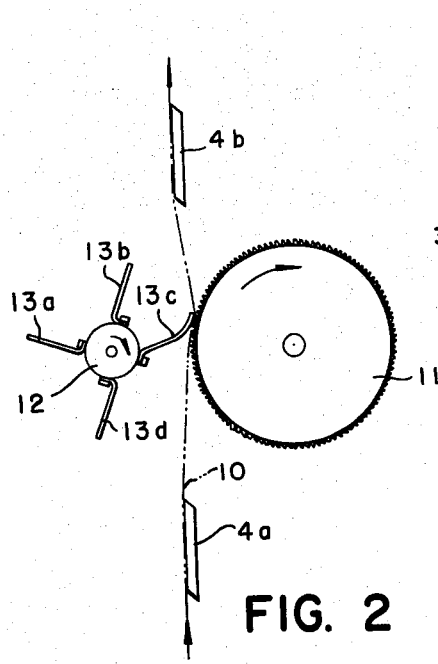
FIG. 2
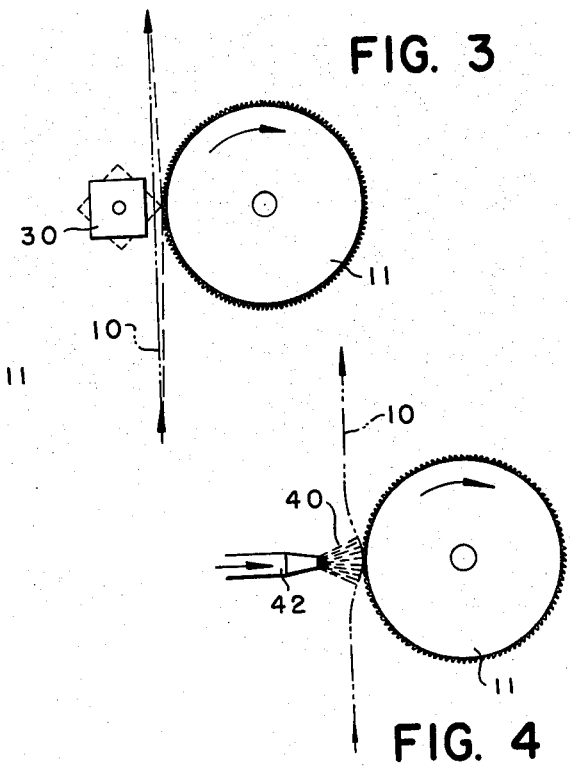
FIG. 3
FIG. 4
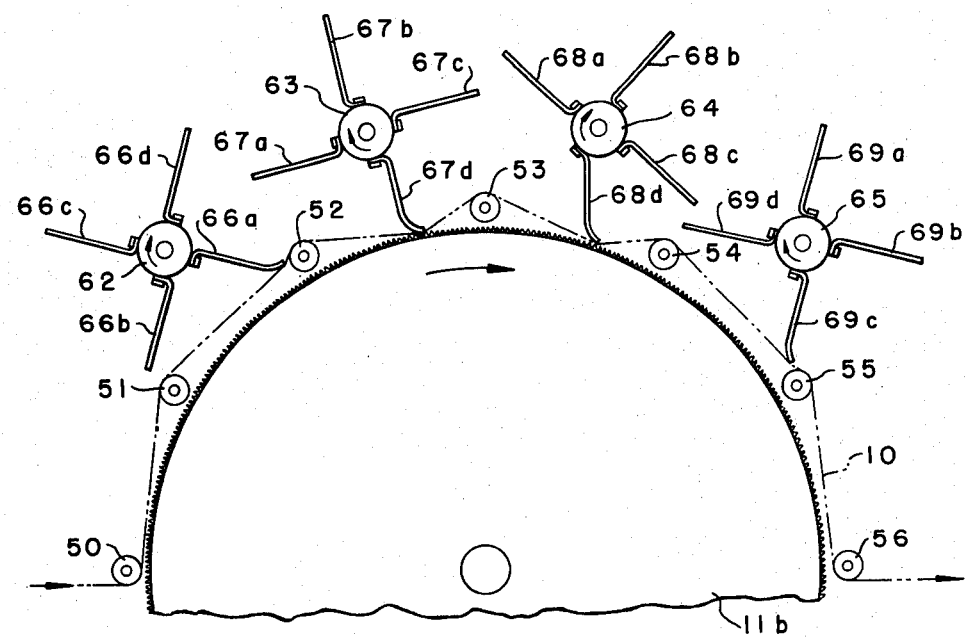
FIG. 5

MECHANICAL SURFACE FINISHING PROCESS FOR TEXTILE FABRIC

This application is a continuation-in-part of copending application Ser. No. 92,815, filed Nov. 9, 1979, now U.S. Pat. No. 4,316,928.

The present invention relates to a process and apparatus for surface finishing fabrics by mechanical means to provide a fabric product having improved surface softness and a desirable fabric hand. The present invention also relates to a textile fabric with modified surface which may be made by the process.

It is generally known that fabrics may be mechanically face-finished to provide various effects on the fabric, such as a soft surface feel, to generate cover, or even to give fabrics made from filament yarns a spun-like hand. These mechanical face-finishing techniques include napping and sanding techniques, the particular technique employed as well as operating parameters selected being determined by the desired effect as well as by the nature of the fabric to be finished. Sanding of textile fabrics, also variously referred to in the art as buffing or emerizing, is generally accomplished according to known methods by passing the fabric over rapidly-rotating cylinders covered with an abrasive, e.g., sanding paper of a suitable degree of fineness or coarseness. The sanding grains which come into contact with the fabric surface for a period of time, depending upon operating conditions, abrade the surface fibers of the fabric and raise a cover which is generally shorter than that which is obtainable by napping.

In sanding type of face finishing operations it is also known that the textile fabric may be forced onto the abrading surface by either tensioning or by setting a predetermined gap somewhat less than the fabric thickness between the abrading surface and a backing device. Frequently the fabric surface obtained by such mechanical finishing techniques must be sheared after sanding or other treatment to provide a product having the desired uniformity of the nap or pile height.

It has been found generally with regard to fabrics treated using known mechanical surface finishing techniques that frequently a considerable amount of fabric strength may be lost especially if a significant alteration of the appearance or hand of the fabric is sought. Also, where it is desired to surface finish very rigid fabrics such as woven polyester-cotton fabrics or woven all-polyester fabrics, the result, particularly after sanding, may be a streaked surface resulting at least in part from tight warp ends in the fabric. These tight warp ends are, furthermore, difficult to avoid in the fabric as a practical matter. Moreover, on many fabrics it is difficult to obtain a dense and uniform modification of the fabric surface. On fabrics made from relatively strong fibers, such as polyester in particular, the cover obtained is frequently thin, non-uniform and "choppy," so that the fabric product is aesthetically unappealing, and there is little or no benefit to the hand characteristics of the product.

Also, mechanical surface finishing techniques may result in a fabric surface nap or pile which is longer than desired so that the length of the nap or pile must be reduced by shearing which may result in an inadequate amount of cover on the fabric product, known as a "hungry" cover. Thus, it is quite difficult, using conventional surface finishing techniques, to provide consistently good quality, uniform products with little or no defects. Furthermore, some fabrics, especially for instance very lightweight fabrics, cannot be face finished at all using conventional techniques.

Accordingly, the process of the present invention has been developed to provide a more uniform surface finish to fabrics than conventional methods, even on fabrics with tight warp ends; streaking has been minimized or prevented entirely. The process can be easily controlled and finish characteristics can be adjusted predictably by varying operating parameters. The surface finish obtained, depending on operating condition and the fabric substrate, may have few broken fibers although it may be characterized as having a very soft touch, or, if desired, may have a dense but very short cover. Depending upon substrate characteristics and operating parameters selected the surface hand of the treated fabric may be suede-like, cotton-like or it may even have the desirable feel characteristics of wool. These different results are not solely dependent on substrate type and may frequently be achieved even on the same fabric substrate type when desired by varying operating parameters. The fabric itself may be caused to develop more drape, or, if desired, processing parameters may be adjusted so as to change primarily only the fabric finish, e.g., surface feel, with little or no effect on the fabric drape and crispness. Thus, it has been observed that appearance and hand characteristics of fabrics treated according to the process of the present invention differ significantly and desirably from the fabric appearance and feel obtainable by conventional methods.

It has also been observed that fabrics that generally cannot be surface finished mechanically at all by conventional methods may be conveniently and easily processed by the present process. For instance, certain lightweight fabrics, such as some jersey knit fabrics, cannot be sanded or, at least, cannot be conventionally sanded conveniently since they tend to "neck down" considerably under the tension required for ordinary sanding and they may, in addition, tend to wrap around the sanding roll. The process of the present invention, however, permits better control of surface finishing conditions and it has been found that even very lightweight jersey knits may be surface finished. Also, a common fabric deficiency is "tight selvedges." This deficiency makes conventional sanding nearly impossible, but according to the process of the present invention such fabrics may be easily finished and there is little or no adverse effect resulting from the "tight selvedges." It has been found that even embossed fabrics may be mechanically surface finished by the present process providing a product having improved hand and appearance in both the embossed and non-embossed areas, and the undesirable "glossy" or "plastic" look in the embossed areas is reduced.

Synthetic filament fabrics, such as polyester filament fabrics, processed according to the present invention may acquire many of the desired hand and appearance characteristics of spun fabrics and frequently also may acquire a desirable surface feel normally associated with fabrics made from finer denier fibers. Fabrics processed according to the present invention, furthermore, may possess enhanced adhesion characteristics, that is, they can be caused to adhere better than untreated materials to another material, such as for instance polyurethane sheet material, using a suitable adhesive.

Accordingly, the present invention relates to a process for mechanically surface finishing a textile fabric, which comprises continuously feeding said fabric from a source of supply such that said fabric lies in a single plane, subjecting successive adjacent sections of the fabric to intermittent mechanical impact with an abrasive means across the width of said fabric thereby avoiding substantial sustained contact between said fabric and said abrasive means, said mechanical impact being at a force and frequency sufficient to cause a substantially uniform modification of the surface characteristics of said fabric.

The present invention also relates to a textile material which may be made according to the process of the invention having a body portion containing a plurality of fibers, of which at least 20 percent by weight, and preferably at least 45 percent by weight, are synthetic fibers, e.g., thermoplastic synthetic fibers such as polyester or nylon fibers. The remaining portion of the textile material, if it is not totally synthetic, may be made up of natural fibers and may even include some nonfibrous materials. The fibers in the textile material have a curvature and are arranged so as to have convex side portions and concave side portions. Those convex side portions of the fibers of the material which are exposed, e.g., those that are at or near the surface of the material and not covered by other fibers, are substantially scarred and they contain a multiplicity of generally short, rather thick lamella-shaped protrusions extending therefrom. While the actual length and number of these protrusions may vary considerably according to the invention depending upon the type of material treated and the severity of treatment, on the average it has been determined that the length of such protrusions will in general be quite short, e.g., less than about 05 mm., preferably less than about 0.03 mm. from the base of the protrusions where they are joined to the main body portion of the fiber to the tip of the protrusions. As mentioned, it has also been observed that the extent of modification of these exposed convex side portions of the textile material may vary depending upon the fabric substrate composition. It is quite apparent, however, that the modification of such characteristics is significant and quite unique as applied to a broad range of fabrics and may be easily identified by comparison of the fabric substrate after modification to an untreated control sample or even to a sample of the same composition and structure which has been surface finished using conventional techniques, and thus will be very clearly shown in the examples below.

The shape of the protrusions has been described in general as being lamella-shaped. This characterization is not meant to imply that individual protrusions have a precisely identifiable and reproducible shape. Rather, the term "lamella" is used in its conventional sense to refer to a thin, flat scale or part (see Webster's Seventh New Collegiate Dictionary, 1965 ed.). Individual protrusions, furthermore, may be of a rather irregular shape, some even being rather long by comparison to their cross-sectional dimension. Nonetheless, on the average, the protrusions are rather short and are rather flat in cross-sectional dimension rather than being of a generally circular cross-sectional dimension which might characterize a true "fibril."

It has also been observed particularly with regard to the preferred products of the present invention that frequently the cross-sectional dimension of the fibers on or near the surface of the textile material themselves may be distorted as a result of the mechanical surface treatment of the present invention while the dimension of the fibers not at the surface may remain undisturbed. This has been observed in certain instances, such as where the fabric sample is a thin, hard fabric, as a "smearing" of the synthetic fibers which are thermoplastic in nature. This smearing may be a result of thermoplastic deformation although applicant is not certain of the mechanism by means of which such "smearing" occurs and is not to be bound thereby. Furthermore, individual synthetic fibers at or near the surface of the textile material may actually be flattened somewhat as a result of the mechanical surface finishing. For example, if the cross-sectional dimension of the individual fibers is substantially circular prior to mechanical surface treatment, it may be observed that after mechanical surface finishing the cross-sectional dimension becomes somewhat ovoid. If the cross-sectional dimension is multi-lobal on the other hand, there may be a substantial deformation of this configuration with regard to fibers at or near the surface. This observed smearing effect and the distortion of the cross-sectional dimension of the individual fibers at or near the surface of the textile material may contribute to the beneficial surface characteristics of the textile material product of the invention.

FIGS. 2 through 5 are schematic views of alternative embodiments of the present invention, showing various means of obtaining intermittent mechanical impact between a sanding means and the fabric being finished.

Figure 1:
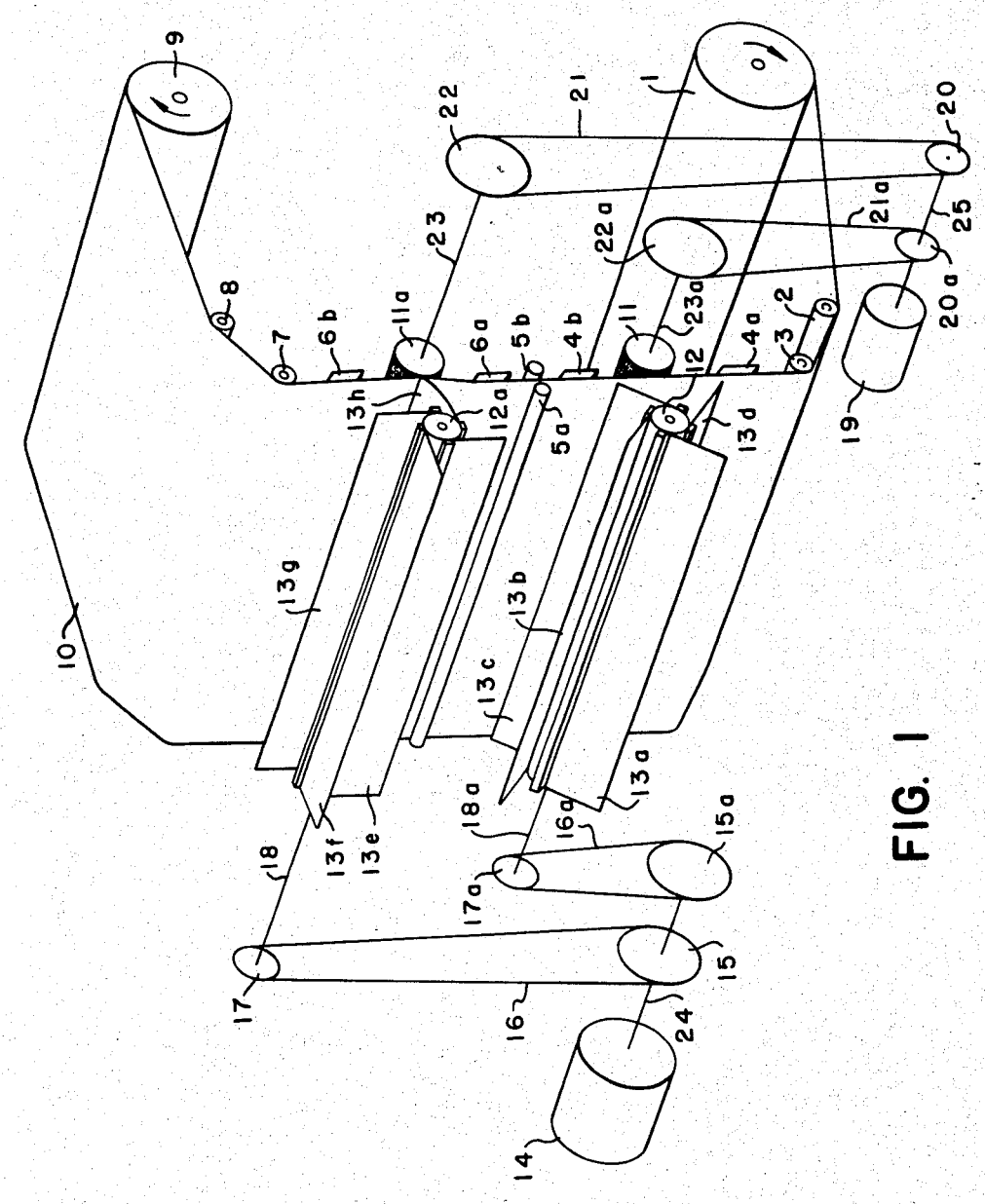
FIG. 1 is a preferred apparatus of the invention designed to carry out the process of the present invention, and the apparatus of the invention may be fully understood by reference to the detailed description of the apparatus.

Referring now to the drawings and in particular to FIG. 1, the fabric 10 to be treated is unrolled from a fabric supply roll 1 under controlled tension and led to guide rolls 2 and 3. Guide rolls 2 and 3 may either be fixed or idling rolls, and they function to position the direction of the fabric so that its continued path will be in approximately the vertical direction while it maintains contact over substantially its entire width with the lower guide plate 4a. The path of the fabric continues over the upper guide plate 4b of the guide plate set and passes between fabric stabilizing rods 5a and 5b over fabric guide plate set 6a and 6b and to guide rolls 7 and 8 which function to change the direction of the fabric, which then moves to fabric take-up roll 9 onto which it is wound.

Guide plate sets 4a and 4b and 6a and 6b may be adjusted in both the horizontal and vertical directions. The construction of guide plate sets 4a, 4b, 6a and 6b may vary widely and may consist of plates as illustrated or actual channels. Between guide plates 4a and 4b and 6a and 6b the fabric passes between abrasive rolls 11 and 11a and corresponding flap rolls 12 and 12a. The abrasive rolls are covered with a suitable abrasive material such as sandpaper, the grit size of which may vary depending upon the desired effect as described more fully below. Guideplates 4a and 4b and 6a and 6b are adjusted to position the fabric accurately so that it will pass near to but not touch sanding rolls 11 and 11a unless it is impacted onto the sanding rolls by action of flap rolls 12 and 12a as described more fully below. Attached by suitable means to rolls 12 and 12a are flaps illustrated in FIG. 1 as 13a, 13b, 13c and 13d on roll 12 and flaps 13e, 13f, 13g and 13h on roll 12a. The flaps may be installed as illustrated by simply bolting them onto the flap roll so that when the rolls are at rest the plane of the flaps is essentially tangential to the rolls. In this embodiment, when the flap rolls are rapidly rotated, the centrifugal force will extend them substantially radially from the roll. The flaps may also be installed so that they extend radially from the flap roll while the roll is at rest, i.e., in the absence of centrifugal forces. The flaps may be made of a wide variety of suitable reinforced or non-reinforce materials such as neoprene rubber, urethane, polyvinyl chloride, nylon, or even steel and other sheet and even composites thereof of sufficient durability and flexibility to accomplish the desired result. The flap rolls may be driven by motor 14 via drive shaft 24, pulleys 15 and 15a and 17 and 17a, belts 16 and 16a and shafts 18 and 18a. Sanding roll 11 and 11a may be driven by motor 19 via drive shaft 25, pulleys 20 and 20a and 22 and 22a, belts 21 and 21a via shafts 23 and 23a.

When in operation sanding rolls 11 and 11a rotate as do flap rolls 12 and 12a. The distance flap rolls 12 and 12a and sanding rolls 11 and 11a respectively is adjusted so that in the absence of fabric 10 the flaps would impinge upon sanding rolls 11 and 11a to a predetermined depth of the flaps. When the machine is operating and threaded up with fabric 10, flaps 13a–h will be extended substantially radially by centrifugal force from the rapidly rotating rolls 12 and 12a respectively and will intermittently impact the fabric with considerable force onto the sanding rolls 11 and 11a.

Depending upon the desired effect, the sanding rolls 11 and 11a and the flap rolls 12 and 12a may independently be rotated either clockwise or counterclockwise. Speed of rotation of both the sanding rolls and flap rolls may also vary widely depending upon the desired effects as described below.

FIG. 2 provides a more detailed representation of a treatment station which comprises the sanding roll 11 and flap roll 12 with flaps 13a, 13b, 13c and 13d fabric guideplates 4a and 4b. In this schematic drawing the fabric 10 is shown while being impacted by flap 13c onto the cover of the sanding roll 11. It should be noted that while FIG. 1 illustrates only two treatment stations both of which are of the same type as that illustrated in FIG. 2, the actual apparatus may include only one station or alternatively two or more stations, e.g., three, four or even more stations may be provided on the apparatus for treatment of one or both sides of the fabric. The treatment stations, furthermore, need not necessarily be all of the same type as illustrated in FIG. 1 but rather may include stations of different types, e.g., those illustrated in FIGS. 3 and 4 discussed below, as well, even on the same apparatus.

As mentioned, FIGS. 3, 4 and 5 illustrate alternative treatment stations provided with means by which the fabric may be caused to impact onto a rapidly moving abrasive means, although it should be appreciated that there may be others within the scope of the present invention. In FIG. 3 the fabric 10 is caused to impact onto the abrasive covered roll 11 by means of a rapidly rotating non-circular bar, for instance as illustrated a square bar 30 which will alternately allow the fabric to clear the sanding roll and to impact it upon the roll. In this embodiment the roll 11 may be covered with a compressible foam which is placed on the roll between its outer periphery and the abrasive means so that the impact of the fabric 10 upon the abrasive means is softened and jamming of the fabric between the abrasive means and the impacting means is prevented. Alternatively the non-circular bar 30 may be covered with a compressible foam for the same purpose. Also, it is particularly advantageous in the embodiment of the invention illustrated in FIG. 3 that the impacting means 30 be disposed either above or below the point of closest proximity between the abrasive means 11 and the impacting means. Such disposition of the impacting means may also be advantageous in the alternative embodiment illustrated, for instance, in FIGS. 2, 4 and 5 as well as in other embodiments where the impacting means may be, for instance, an oscillating bar or even a rotating eccentric roll, and the like.

FIG. 4 illustrates a further embodiment where an intermittent airstream 40 is emitted from a nozzle 42 to cause the fabric 10 to be impacted intermittently upon the surface of the sanding roll 11.

FIG. 5 illustrates yet another embodiment of the apparatus of the present invention. In this embodiment the fabric 10 is moved over idler roll 50 changing its direction and then over spacing rolls 51, 52, 53, 54 and 55. Then the fabric is caused to move over idler roll 56 to again change the fabric direction. The spacing rolls are designed to prevent contact between the fabric 10 and the sanding surface unless impacted upon it by the flaps as illustrated. Thus, during operation flap rolls 62, 63, 64 and 65 impact the fabric 10 onto the abrasive-covered surface of 11b with flaps 66a through d, 67a through d, 68a through d and 69a through d.

A wide variety of fabrics may benefit from being processed according to the present invention. Examples of such fabrics include woven, knit, non-woven fabrics, as well as coated fabrics and the like. Even certain films may benefit from treatment according to the present invention and films made from polymers, paper, and even natural products in sheet form such as leather may be processed according to the present invention. Examples of knit fabrics include double knits, jerseys, tricots, warp knit fabrics, weft insertion fabrics, etc. Woven fabrics may be plain weaves, twills or other well-known constructions. Such fabrics may be constructed from spun or filament yarns or may be constructed by using both types of yarns in the same fabric. Fabrics made from natural fibers such as wool, silk, cotton, linen may also be treated, although the preferred fabrics are those made from synthetic fibers such as polyester fibers, nylon fibers, acrylic fibers, cellulosic fibers, acetate fibers, their mixtures with natural fibers and the like. Particularly significant improvement in the surface characteristics of fabrics has been observed on fabrics containing polyester fibers.

As noted above, fabrics processed according to the present invention generally may be characterized as having a more uniform surface finish than fabrics processed according to conventional methods. The process may be used to provide a finish on the fabric surface which may be apparent to the naked eye, or a finish may be achieved which may not be apparent to the naked eye but which is quite apparent to the touch. The fabric may assume a generally softer hand and the fabric bending modulus may be reduced.

Fabric such as knit texturized polyester filament fabrics may be caused to shrink upon being processed according to the present invention in the width direction resulting in a higher fabric weight. Furthermore, even if the fabric is stretched again to its original width and approximately its original weight per unit area, the fabric may generally be characterized as having a fuller, bulkier hand. Polyester filament fabrics may lose their undesirable "plastic-like" feel and the hand of such fabrics will become more similar to fabrics made from natural fibers such as wool or cotton. Products such as polyester double knit fabrics may, in certain instances, be characterized as having a density, uniformity and shortness of cover which cannot be obtained practically by means of conventional sanding or napping techniques.

The process of the present invention permits finishing of fabrics which are generally too stretchy or too light in weight to be finished by conventional sanding techniques. Conventional methods rely frequently on tension to bring the fabric into contact with the sanding means. Where contact is accomplished by compressing the fabric between a backing and the sanding surface, tension is required to keep the fabric from being grabbed by the sanding roll and wrapped around it. Due to the intermittent nature of the contact with the sanding roll and due to the proper use of fabric guiding plates a considerably lower amount of tension is sufficient according to the process of the present invention so that it is possible to finish very lightweight fabric such as lightweight jersey knits. These lightweight jerseys in conventional finishing techniques pose very serious problems because they elongate very easily and neck down under tension, and their selvedges have a tendency to roll under tension. Also, in conventional sanding techniques it is almost impossible to control the degree and uniformity of treatment of lightweight woven fabrics while both results are possible according to the process of the present invention.

It has been found that particularly good results may be achieved according to the process of the present invention by application of the process to a double knit such as that constructed from texturized polyester filament yarns, e.g., from 150/34 denier yarns. Ordinarily, in order to obtain an appealing, soft, spun-like, uniform surface finish by conventional sanding, fabrics of this type must be constructed from more expensive yarns, for example 150/50 denier or even 150/68 denier yarns. Fabrics constructed from 150/34 denier yarns, however, generally provide a choppy, coarse-feeling, non-uniform surface finish when sanded conventionally. It has been found, however, surprisingly that fabrics made from such 150/34 denier texturized polyester yarns may be subjected to the process of the present invention to obtain a spun-type finish on the fabric that is approximately equivalent in hand and appearance to the finish obtained by conventional sanding of more expensive fabrics constructed from, for instance, 150/50 denier texturized polyester filament yarns. Because a heavier fabric generally must be constructed from, for instance, 150/50 denier filament yarn in order to maintain fabric crispness, the ability to use a fabric constructed from 150/34 filament texturized polyester yarns yielding an equivalent finish also permits the use of a lesser weight fabric.

The process of the present invention is not limited, however, to textile materials per se and, for instance, application of the process to clear films may result in a matte-type finish providing a translucent film. Application of the process to paper of sufficient strength to undergo treatment may result in a softening of the surface of the paper.

According to the process of the present invention, successive adjacent sections of the fabric are intermittently impacted upon an abrasive means across the entire width of the fabric. The fabric is ordinarily extended to its open width and may be moved in the warp or longitudinal direction. Sustained substantial contact between the fabric and the abrasive means is avoided, the mechanical impact being of a force and frequency sufficient to cause a substantially uniform modification of the surface characteristics of the fabric. As will be apparent to those skilled in the art, the extent of modification of the surface characteristics, the specific effects obtained, and the rate at which these effects may be obtained will depend upon the operating conditions of the machine used in the process and the nature of the fabric being treated. Operating parameters of the apparatus used in the process, e.g., force and frequency of impact, grit size of abrasive means and other variables, may be adjusted over a broad range. For instance, the linear speed of the fabric relative to the sanding means may vary from about 1 yard to about 200 yards per minute and will preferably be between about 5 and about 100 yards per minute, depending upon the number of treatment stations available, the type of fabric and intensity and character of the treatment desired.

The abrasive means employed in the process and in the apparatus of the present invention may include any of a wide variety of abrasive mechanisms which function to provide the desired results in the product material. Typically, as illustrated in FIG. 1, the abrasive means may be a drum which has been covered with sandpaper or sanding cloth. It has been found that using such abrasive means as a drum covered with sanding paper or sanding cloth according to the teachings of the present invention will provide an apparatus and method whereby many results obtainable by other sanding methods and obtainable by napping as well as results not obtainable by either napping or conventional sanding techniques may be achieved.

It should be understood, however, that the invention is not limited to drums covered by sandpaper or sanding cloth as the abrasive means, but may include other suitable abrasive means. One particular embodiment which has been envisioned is particularly suitable where all results obtainable by napping may be achieved. According to such embodiment the drum instead of being covered by sandpaper or sanding cloth is covered with uniformly spaced napping wires. Thus, the surface of the material to be treated would be impacted by the impacting means in a similar fashion as illustrated in the figure onto a drum covered with such napping wires. Typically the wires will be rather fine, flexible or flexibly embedded napping wires.

It may also be advantageous to embed the napping wire in a support substrate so that the wire tips protrude very little or barely from the support substrate. The substrate may be of controlled compressibility such as foam rubber, soft rubber, felt and the like. In this manner the compressible embedding medium will be compressed during impact. This in turn will determine the extent to which the wire tips will protrude from the surface of the embedding medium which will determine how far the napping wire tips can penetrate into the fabric surface. By means of such technique the character and intensity of the effect achieved may be more precisely controlled. Also, the substrate may assist in releasing the fabric after impact from the napping wires and so help to prevent or minimize the tendency of the fabric to wrap around the napping roll.

Where the abrasive means is a sanding paper, the grit of the sanding paper may vary widely, with grit sizes of about 16 to about 600, preferably between about 80 and about 400, e.g., about 180 to about 320 being appropriate. On machines with multiple treatment stations different size grits may be employed for the different sanding rolls in different sequences to accomplish specific effects. For example, it has been found desirable to pretreat the fabric at a first sanding station with a fairly coarse grit in order to make the fabric surface more easily alterable by the subsequent finer grits at subsequent treatment stations.

The use of finer grit sanding paper will be particularly recommended for lightweight fabrics made from fine denier fibers or filaments, and will also be recommended for other fabrics, if a particularly subtle and fine finish is desired and when it is desired that the effects of the treatment be confined primarily to the fabric surface. The relative intensity of the treatment accomplished by means of the present invention is dependent not only upon the grit of the abrasive means but also on the force of the impact of the fabric on the abrasive means. This is in turn a function of the radius of the flap roll, flap length, bending modulus of the flaps, specific gravity or density of the flaps and the extent to which the flap front edge does not clear the surface of the opposing sanding roll and speed of rotation of the flap roll.

In general it has been observed that a significant effect may be obtained according to the process of the present invention with a finer grit sandpaper than that used in standard sanding because the cutting edges of the grit are impacted upon the fibers of the fabric with considerable force causing most if not all of the sanding grains to cut into or abrade the surface of the textile material. Since a significant effect is obtained with a finer grit and since simultaneously more cutting grains of a finer grit are located on the surface of the sandpaper per unit area it is thought that the number of fibers affected per unit surface area is consequently significantly greater than, and perhaps several times, that obtained with the coarser grit material in a normal sanding operation so that the finish which results is more uniform, fine and dense. Thus, frequently fabrics treated according to the process of the present invention may not require shearing since the individual fiber ends which are formed are generally very short and uniform in length which also distinguishes the products of the present invention from those of conventional sanding techniques.

The surface speed of the sanding means relative to the fabric may vary widely and may be between about 10 feet per minute and about 8,000 feet per minute, preferably between about 500 feet per minute and 2,500 feet per minute. As discussed above in connection with the apparatus, the sanding roll may be rotated clockwise or counterclockwise and the direction of rotation of the flap rolls may either correspond to that of the sanding roll or may be opposite thereto. For instance, where the sanding roll and the flap rolls are both rotated in a clockwise direction very lightweight, stretchy fabric may have less tendency to be grabbed by the sanding roll and to wrap around it.

The force at which the fabric is caused to impact upon the abrasive means is a function of the speed of rotation of the flap roll, the length and stiffness of the flaps, the diameter of the flap roll, as well as the density of the flap material, and other variables, but generally the flap roll will rotate at speeds from about 100 to about 8,000 rps's, preferably from about 500 to about 6,000, e.g., about 1,000 to about 4,000 rpm's.

Fabrics which have been processed pursuant to the present invention may be subjected to various subsequent treatment operations. It has been found, for instance, that a particularly appropriate post treatment for the products of the present invention may be brushing. Thus, fabrics may be mechanically surface finished according to the invention using comparatively mild treatment conditions, e.g., a relatively fine grit sandpaper as the abrasive means, or a relatively low impact force of the fabric onto the abrasive means, or a comparatively lower frequency of impact so that the strength of the fabric is reduced less than it might otherwise be. Then by brushing the fabric vigorously using, for example, nylon or metal brushes, such as brass or steel brushes, modification of the surface characteristics of the fabric may be desirably enhanced.

I have illustrated and described what I consider to be the preferred embodiments of my invention. It will be apparent, however, that various modifications may be resorted to without departing from the broader scope of the invention as defined by the claims.

EXAMPLE 1

Figure 6:
FIGS. 6 through 52 are electron scanning photomicrographs taken at a variety of magnifications of fabric samples and other substrates which have been subjected to the mechanical surface finishing process of the present invention. A detailed description of the textile fabric or other substrate and conditions of treatment is provided in the examples hereinbelow.
Figure 7:
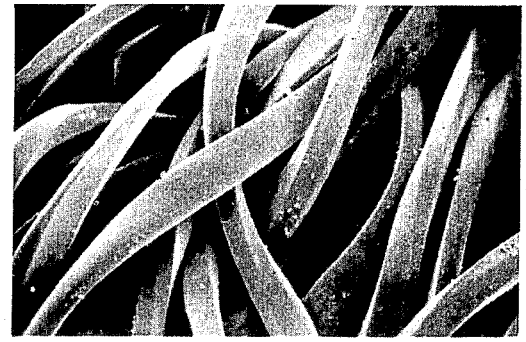

A doubleknit fabric was prepared from 1/150/50 Monsanto type 446 100 percent texturized polyester filament yarn. The fabric was scoured, jet-dyed to a light blue color, slit and then heat set to provide a control sample. The finished weight was between $13\frac{3}{4}$ and $14\frac{1}{4}$ ounces per yard, with a width of between 60 and 62 inches. The Mullen Burst Strength (ASTM No. D-231 (1975)) was 275 lbs. FIGS. 6 and 7 are scanning electron photomicrographs (SEPM) taken of the fabric at 100× and 350× respectively.

Figure 8:
Figure 9:
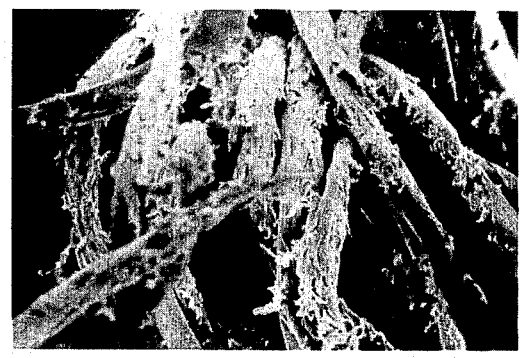

A separate sample of the above yarn was knitted and the resulting doubleknit was then processed by scouring, jet-dyeing to a light blue color and slitting. After slitting, but prior to heat setting the fabric was mechanically surface treated according to the process of the present invention to provide a product of the present invention. SEPMs of the sample are provided in FIGS. 8 and 9 at 100× and 350×. The processing parameters are set forth below in the Table. After treatment, the Mullen Burst value was 235 lbs.

Figure 10:
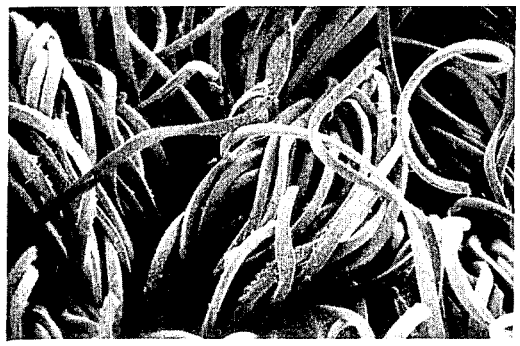
Figure 11:

Another sample of the above fabric was treated in substantially the same manner as set forth above for the sample according to the invention, although it was colored navy blue and instead of mechanically surface finishing prior to heat setting according to the present invention it was Gessner sanded. The Mullen Burst value for the Gessner-sanded product after treatment was 230 lbs. SEPMs of the Gessner-sanded product are set forth below in FIGS. 10 and 11 at 100× and 350×.

Observation of the fabric treated according to the present invention revealed that it had a very luxurious, warm and soft surface hand and a very short, dense cover. The cover was readily apparent to the naked eye although because of its relative shortness it permitted the construction of the fabric to be fully visible. The control fabric, that is the fabric that has had no mechanical surface finishing, by contrast had a clear surface, no cover, and had the typical hard, "plastic", somewhat slick appearance and hand of texturized polyester doubleknits. The appearance and hand of the sample treated according to the present invention was comparable to that of a fabric prepared from fine wool yarns. The sample which was conventionally surface finished by means of a Gessner sander did not approach the desirable characteristics of the sample treated according to the present invention, especially with regard to softness of hand, density of cover, and similarity to a fabric made of fine wool yarns. Reference to the SEPM of the control sample, the sample treated according to the present invention, and the conventionally sanded sample at magnifications of 100× and 350× shows that the fibers of the fabric of the present invention are broken to some extent but are predominately extensively modified by the formation of lamella shaped protrusions on the fiber surfaces and by the formation of scar type surface modifications on the fiber surfaces. The Gessner-sanded samples by contrast show a substantial number of cut and broken fibers with only very minor modification of the surface characteristics of the individual fibers.

EXAMPLE 2

Example 1 was repeated using a 1/150/34 100 percent texturized polyester filament yarn. A control (untreated) sample, Gessner-sanded sample and a sample treated according to the invention were prepared. In this example the Gessner-sanded sample exhibited no significant difference from the untreated control sample, and the product in fact did not have a commercially acceptable finish due to the relatively coarse nature of the 150/34 texturized polyester yarns from which it was made. This same fabric which was treated according to the present invention, however, had a significantly improved surface feel and a warm, pleasant wool-like hand as compared to the control sample. In fact, the sample compares very favorably to the Gessner-sanded version made according to Example 1 from the more expensive 150/50 texturized polyester filament yarns. The Mullen Burst value for the untreated control was 285 lbs. as compared to 220 lbs. after Gessner-sanding and 240 lbs. after surface finishing according to the present invention. Thus, while the surface modification is significant according to the process of the present invention, less strength loss is observed compared to Gessner-sanding.

EXAMPLE 3

The fabric used in this Example was a yarn-dyed, polyester doubleknit. The yarn used was a 1/150/34 texturized 100 percent polyester filament yarn. The control sample was prepared by sponging, slitting and drycleaning the knitted fabric. The finished weight was 12.4 ounces per yard, with a width of 64 inches, and a Mullen Burst strength of 215 lbs. The sample of the present invention was then processed as set forth in the Table. The Mullen Burst value was 120 lbs. After surface finishing the fabric was heat set, sheared, heat set again and decated. The finished weight was 11.6 ounces per yard, with a width of 60 inches.

A sample of the same cloth was then processed in the same manner as described above except that instead of mechanical surface treating according to the present invention the fabric was napped after the first heat setting operation, and then sheared, heat set again and decated. The finished weight was 11.70 ounces per yard with a width of 59¼ inches.

Figure 12:
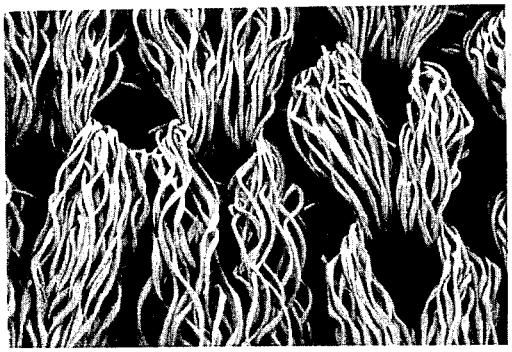
Figure 13:
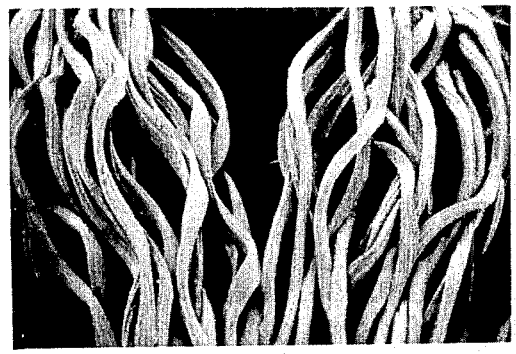
Figure 14:
Figure 15:
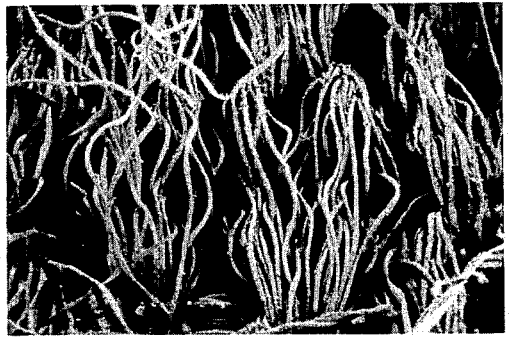
Figure 16:
Figure 17:
Figure 18:
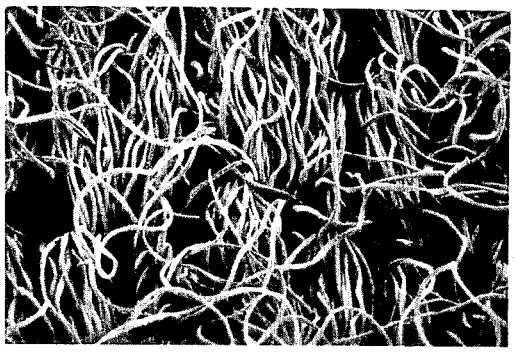
Figure 19:
Figure 20:

The fabric treated according to the process of the invention had a very soft, cotton-like surface hand as compared to the typical hard, slick, "plastic" and unappealing hand of the untreated control sample. Because of the relative shortness of the cover on the fabric treated according to the invention the clarity of the pattern of the fabric was not obscured to any measurable extent except for a very minor reduction of color contrast. The fabric construction, however, was still discernable. The napped fabric made from the same control fabric had a much harsher, drier somewhat wool-like hand. Both the color pattern on the surface and the construction features of the fabric were extensively obscured by napping. FIGS. 12, 13 and 14 are SEPMs at 35×, 100× and 350× of the control sample. FIGS. 15, 16 and 17 are SEPMs at 35×, 100× and 350× of the doubleknit yarn dyed product which has been treated according to the process of the present invention. FIGS. 18, 19 and 20 show SEPMs at 35×, 100× and 350× respectively of the napped samples. Comparison of the SEPMs reveals that the fibers at or near the surface of the sample which has been treated according to the process of the invention are relatively severely modified with the formation of lamella-type protrusions and scars as well as by a very small amount of cut fibers. The napped samples by contrast show very little or no actual fiber surface modification although there are a substantial number of cut fibers. Visual observation reveals that the napped sample has a random layer of disoriented fibers established on the surface forming a substantially flat cover on the fabric. The yarn structure has been substantially disturbed, and the original construction is largely obscurbed. On the sample treated according to the process of the present invention, by contrast, the original yarn structure is substantially intact and very few randomly oriented fibers are observed on the surface of the fabric.

EXAMPLE 4

The characteristics of 100 percent acrylic doubleknit were compared before surface finishing according to the present invention and after such finishing. The processing conditions for the mechanical surface finishing according to the invention are set forth in the Table.

Figure 21:
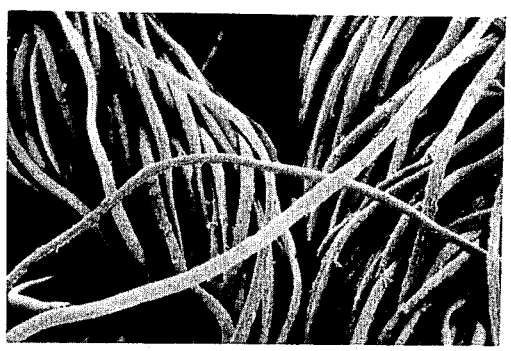
Figure 22:
Figure 23:
Figure 24:

It was found that the sample which was treated according to the invention had a more natural, wool-like feel and a soft surface hand, while the control sample by comparison had a somewhat plastic-like hand typical of synthetic fabrics, although the plastic-like appearance was somewhat less apparent than would be the case for fabrics made from polyester fibers. Examination of the SEPMs of the fabric according to the present invention shown in FIGS. 21 and 22 at 100× and 350× respectively show the formation again of lamella-type protrusions on the fiber surface as well as scarring of the fiber surface. Comparison to the control samples shown in FIGS. 23 and 24 again at 100× and 350× show no similar characteristics.

EXAMPLE 5

The characteristics obtainable by the process of the invention applied to 100 percent polyester woven fabrics made from a filament warp yarn and a spun filling yarn were compared. The starting fabric was woven from a 2/150/34 Danbury-242T Dacron polyester filament warp yarn (lot number 841). The filling yarn was a spun 12/1 T-350 Trevira polyester yarn.

The control sample was prepared by Mezzera treatment, jet-dyeing with a navy blue dye, and finished by heat setting, shearing, and decating. The finished width was 59.4 inches (inside selvedges) with a weight of 11.5 ounces per yard. The strength as measured by the Scott Grab Tensile test (ASTM number D-1682, (1975) was 263 lbs. for the warp and 156 lbs. for the fill.

The above processing sequence for the control sample was modified by surface treatment according to the present invention prior to Mezzera treatment with the remaining steps in the process being identical to those set forth above for the control sample. The finished weight and width were the same as for the control sample. The mechanical surface treatment conditions are set forth in the Table below. After treatment the Scott Grab Tensile (SGT) value was for the warp 205 lbs. and for the fill 47 lbs.

The above procedure was repeated except that the mechanical surface treatment according to the invention was performed after Mezzera treatment and prior to jet-dyeing with the other processing steps being in the same order. The finished weight and width were the same. SGT strength for the warp was 246 lbs. and for the fill was 75 lbs.

The above process was repeated again except that the mechanical surface treatment according to the invention was performed after jet-dyeing and prior to heat setting with the other processing steps remaining the same. The finished weight and fabric width were again the same.

The latter procedure was followed again except that instead of mechanical surface treatment according to the present invention prior to heat setting and after dyeing, the fabric sample was Gessner sanded at this stage in the process. The finished weight and width were the same. The SGT value was 259 lbs. for the warp and 93 lbs. for the fill.

The above procedure was repeated again except that napping was performed on the fabric after jet-dyeing but prior to heat setting. The finished weight and width of the fabric were the same. The SGT value was 264 lbs. for the warp and 147 lbs. for the fill.

Examination of the samples which were processed according to the invention before dyeing revealed that a wool-like hand was achieved. Mechanical surface treatment according to the invention after dyeing of the fabric resulted in a fabric having a cotton-like hand.

Thus, it can be seen that appropriate variation of the processing steps can be used to achieve two distinctly different products from the same starting material.

Depending upon the processing sequence the samples treated according to the invention generally had a very attractive, soft and pleasant wool or cotton-like hand, while the fabric which did not have any surface treatment had the customary hard, harsh feel of polyester fabric. Sanding by conventional means, namely with a Gessner sander, resulted in only minor modification of the hand of the control sample, although the result did not approach either the softness or luxuriousness of the surface feel obtained by the present invention. The sample which was napped resulted in a relatively soft surface hand as compared to conventional sanding, but it did not produce either a pleasant or a soft surface finish as was achieved according to the present invention, especially where the surface treatment was performed prior to dyeing. Also, it was noteworthy that napping resulted in a considerably less uniform and longer cover with a great deal of "wild hair" protruding from the fabric surface. Even after shearing the finish obtained by the present invention was both more uniform and more attractive than the finish obtained according to the conventional techniques.

Figure 25:
Figure 26:
Figure 27:
Figure 28:
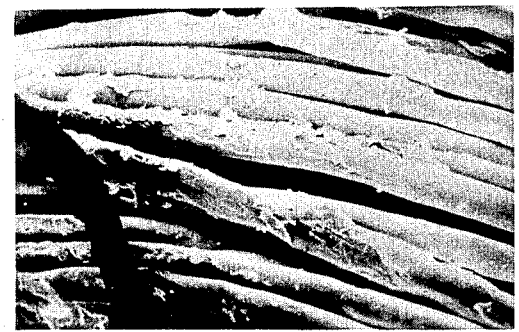
Figure 29:
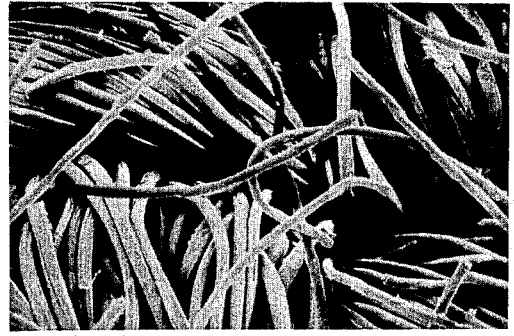
Figure 30:
Figure 31:
Figure 32:
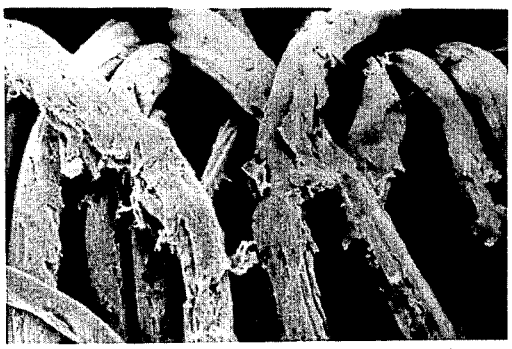

FIGS. 25 and 26 are SEPMs of the control samples at 100× and 350× respectively. FIGS. 27 and 28 are the Gessner-sanded samples at 100× and 350×, and FIGS. 29 and 30 are the samples which were napped, again depicted at 100× and 350×. FIGS. 31 and 32 are the samples which were finished according to the present invention by mechanical surface treatment after dyeing but prior to shearing and decating. Examination of SEPMs of the samples mechanically surface finished prior to Mezzera treatment and those treated after Mezzera treatment but prior to dyeing appeared almost identical to FIGS. 31 and 32 and, therefore, need not be shown. As the SEPMs reveal, the fabric samples treated according to the invention, whether prior to dyeing or after dyeing, all showed substantial lamella protrusions from the surface of the fabric as well as a substantial amount of scarring. Plastic deformation of the fibers was also evident. Conventional Gessner sanding resulted by contrast in only a limited amount of fiber surface modification with little or no lamella formation and no plastic deformation of the fibers. Napping resulted in even less fiber surface modification, no plastic deformation of the polymeric fibers although a significant amount of fiber cutting is apparent.

EXAMPLE 6.

A jersey knit was mechanically surface finished according to the present invention and compared with a non-finished control sample. The control was prepared from 100 percent Dacron polyester T-56 1/70/34 yarns. The sample was processed by Mezzera treatment, jet-dyeing a light green color, slitting and heat setting. The finished weight was 5.75 ounces per yard with a width of 63 inches. The Mullen Burst strength was 130 lbs.

Next, the above process was modified by treatment of the fabric after heat setting according to the invention. The process and conditions were as set forth in the Table. The Mullen Burst strength after treatment was 123 lbs.

Observation of the finished samples reveals that the sample treated according to the present invention had a soft, warm, and luxurious hand; while the untreated control had a relatively slick surface hand typical of polyester fabrics. The sample treated according to the invention may be said to have a hand that is comparable to that of fabrics made from spun yarns.

EXAMPLE 7

Samples of 65/35 polyester cotton blends were treated according to the present invention and then compared to control samples. The warp and fill yarns were both 65 percent polyester, 35 percent cotton. The control sample was prepared by singeing and mercerizing the fabric. The finished weight was 4.86 ounces per square yard and the finished width was 60.3 inches. A separate sample of the fabric was processed in the same manner as the control sample but was subsequently finished by treating according to the process of the invention. The treating conditions are set forth in the Table. For comparison purposes another sample was treated as above by singeing, mercerizing and then Gessner sanding, followed by range dyeing, finishing and sanforizing of the cloth.

A visual comparison of the control sample with the sample treated according to the present invention showed that the sample of the invention had a substantially softer and more pleasing, cotton-like surface hand than the control without any significant loss in fabric crispness. By comparison sanding of the same style fabric by conventional sanding provided very little beneficial effect on the fabric in terms of its hand, or other characteristics.

Figure 33:
Figure 34:
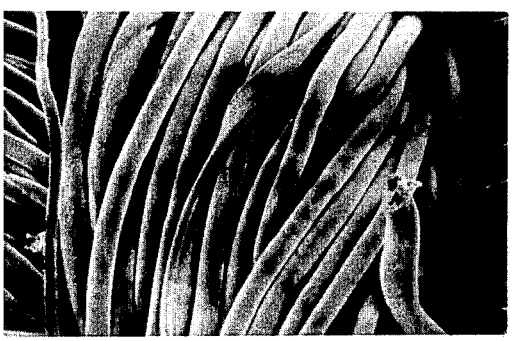
Figure 35:
Figure 36:
Figure 37:
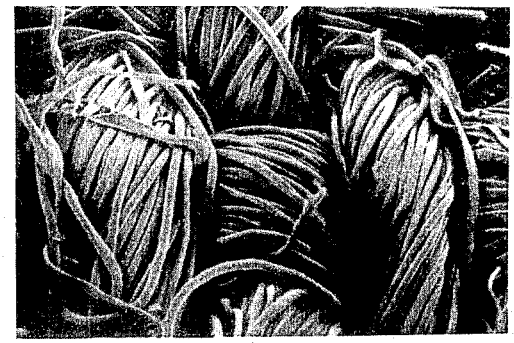
Figure 38:

FIGS. 33 and 34 are SEPMs of the control sample at 100× and 350×. FIGS. 35 and 36 are SEPMs of the sample which was processed according to the invention, also at 100× and 350×. FIGS. 37 and 38 are SEPMs at 100× and 350× of the Gessner-sanded sample. Examination of the SEPMs revealed that the sample which was treated according to the process of the invention has lamella-type protrusions on the fibers at or near the surface of the fabric. There were also a few cut fibers, scarring and significant thermoplastic deformation of the polyester fibers. It was also evident that the yarns immediately at the surface of the fabric were flattened, apparently in conjunction with thermoplastic deformation of the polyester fibers. Observation of the SEPMs of the Gessner sanded samples revealed that the process resulted in very little modification of the surface fibers although certain randomly oriented fibers and some cut fibers were present on the fabric surface.

EXAMPLE 8.

A sample of woven 80/20 polyester cotton having a spun warp and a filament fill yarn was treated according to the process of the invention and compared with a control sample. The warp yarn was a 65 percent polyester, 35 percent cotton yarn. The fill yarn was a texturized 100 percent polyester filament yarn.

The control sample was prepared by the steps of heat setting, singeing and mercerizing. The finished weight was 4.94 ounces per square yard and the finished width was 60.2 inches. SGT strength of the warp was 133 lbs. and 131 lbs. for the fill.

A sample of the above fabric processed in the identical manner was finished by mechanical surface treatment according to the process of the invention. The finished weight and width were both the same as for the control sample. The processing conditions are set forth in the attached Table. The resulting SGT strength was 122 lbs. for the warp and 101 lbs. for the fill.

A similar fabric having a spun warp yarn of 65 percent polyester and 35 percent cotton and a fill yarn of texturized 100 percent polyester filament yarn was processed by heat setting, steam treating, mercerizing, and range dyeing to provide a tan fabric. The fabric was then conventionally Gessner sanded, finished and sanforized. The finished weight was 5.35 ounces per square yard, and the finished width was 60.5 inches. The SGT strength for the warp was 207 lbs. and for the fill was 181 lbs. The tensile strength characteristics of the fabric prior to treat ment were unavailable.

Visual comparison of the sample treated according to the present invention with the control sample showed that while the surface appearance of the fabric was not significantly changed, the surface feel of the fabric treated according to the present invention was substantially softened as compared to the rather hard surface feel of the untreated control sample. The fabric crispness of the treated samples as compared to the control sample was substantially retained. By contrast, little or no advantageous modification was observed when a similar fabric was subjected to Gessner sanding.

Figure 39:
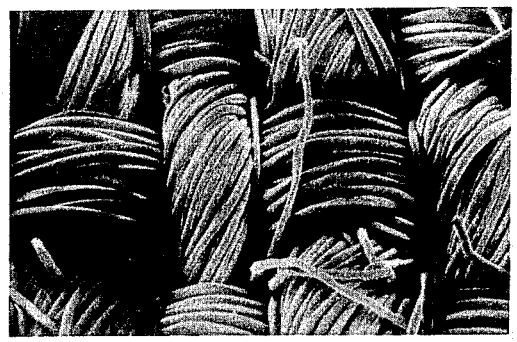
Figure 40:
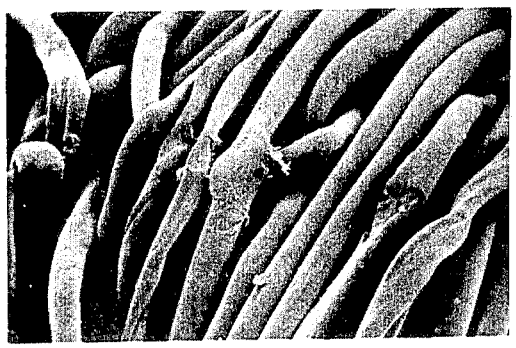
Figure 41:
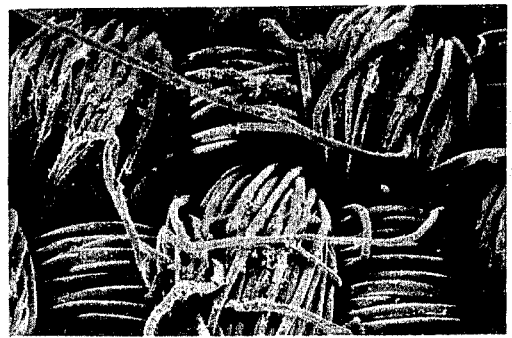
Figure 42:
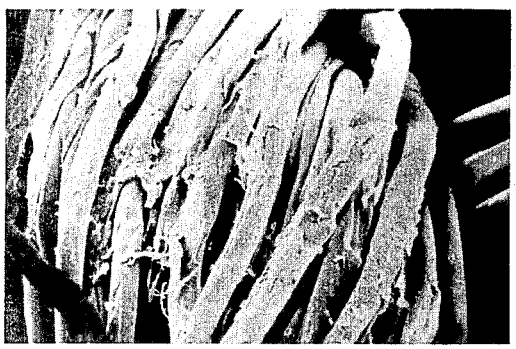
Figure 43:
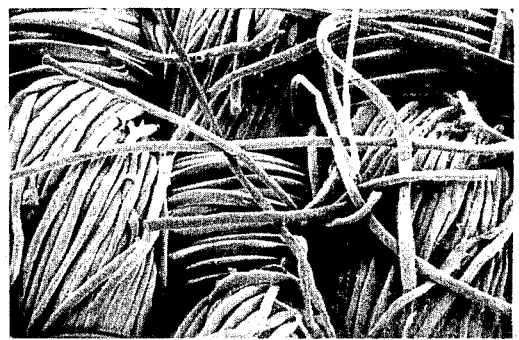
Figure 44:

FIGS. 39 and 40 are SEPMs of the control sample at 100× and 350× FIGS. 41 and 42 are SEPMs taken at 100× and 350× of a sample which has been prepared in the same manner as the control sample and then mechanically surface finished according to the invention. FIGS. 43 and 44 are SEPMs of the sample which has been Gessner sanded and prepared as described above. Examination of the SEPMs shows that very few of the fibers are cut in the sample processed according to the present invention. Rather, the surface of the fibers has been significantly modified in the process. Some lamella-type protrusions are produced and scarring was particularly obvious. Some plastic deformation of the polyester fibers was observed. Also, a flattening of the yarn surfaces was again observed. With regard to the Gessner-sanded sample, except for some cutting of the fibers there was little apparent effect on the fibers of the fabric.

EXAMPLE 9

An 80/20 polyester/cotton blend fabric was treated according to the process of the invention using the processing conditions set forth in the Table before range dyeing. After range dyeing it was observed that some of the advantageous characteristics of the fabric treated according to the process of the invention were apparently lost. This sample, however, was subsequently brushed with either a nylon brush or a steel brush, and it was observed that the original beneficial effects were re-established and actually significantly enhanced, without any substantial strength loss. In fact, it was determined that even where the sample was mechanically surface finished according to the invention after dyeing that the advantageous effect of brushing with either a nylon or a steel brush resulted in a significant enhancement of the beneficial effects of the mechanical surface treatment in terms of both fabric surface softness, pleasantness and luxuriousness of feel, again without any substantial strength loss. A similar sample which was not mechanically surface finished according to the invention was simply brushed after dyeing with a nylon brush and a separate sample was brushed with a steel brush under equivalent conditions and practically no beneficial effect on the samples was observed.

EXAMPLE 10

A 100 percent filament embossed woven polyester napery fabric was treated according to the process of the invention, and its characteristics were compared to that of an untreated control sample. The sample treated according to the invention had a pleasing appearance resembling that of genuine cotton jacquard damask fabric and even the depressed embossed areas of the fabric were beneficially affected. By contrast, the untreated control sample had a glass-like sheen and a plastic appearance quite dissimilar to the subtle and fine appearance of the high priced jacquard woven damask fabric.

EXAMPLE 11

A control sample of woven 100 percent polyester filament warp and fill napery fabric was prepared and its characteristics were compared to that of a similar sample which was treated according to the process of the invention. It was observed that in addition to the improved surface hand characteristics, tablecloths or napkins made from the above-described material and processed according to the invention could be stacked without the piles of stacked fabric sliding and falling down. The overall appearance of the fabric was, however, changed very little and the fabric had a completely clear face. However, the fabric in effect did have a very advantageous cotton-like hand.

EXAMPLE 12

Figure 45:
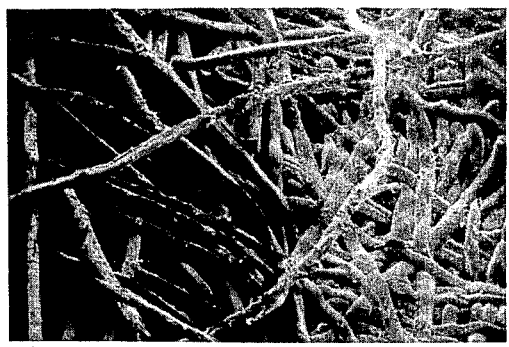
Figure 46:
Figure 47:
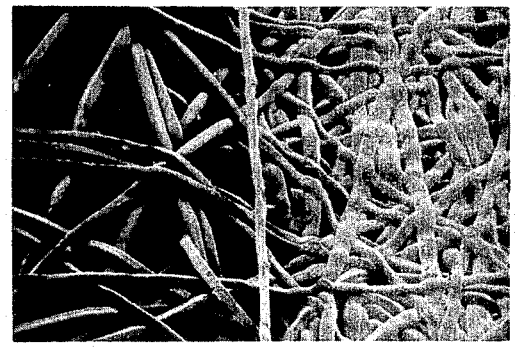
Figure 48:
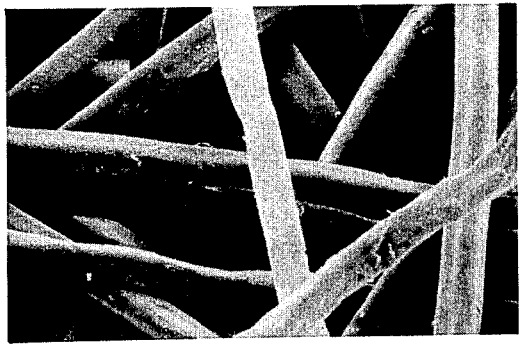

This Example illustrates application of the process of the invention to a 100 percent nylon nonwoven point-bonded fabric. A control sample was prepared and a separate sample was subsequently processed according to the invention. The processing conditions are set forth in the Table. The nonwoven nylon fabric when treated according to the process of the invention exhibited a dramatically softer, kinder surface hand than the slick, "glassy" starting material. A dense, somewhat longer cover was created giving the surface of the fabric the touch and surface feel of material made from natural fibers. Little strength loss was encountered due to the treatment of the fabric. Comparison of the SEPMs of the sample treated according to the process of the invention shown in FIGS. 45 and 46 at 100× and 350× respectively to the control samples as shown in FIGS. 47 and 48 at 100× and 350× respectively shows that there has been a significant generation of lamella-type protrusions on the fiber surface, fiber surface scarring, and visual observation revealed cut fibers.

EXAMPLE 13

A control fabric was prepared of a napped substrate fabric containing on its surface a coagulation type coating. A separate sample of the fabric was processed according to the invention using the processing conditions set forth in the Table.

Figure 49:
Figure 50:
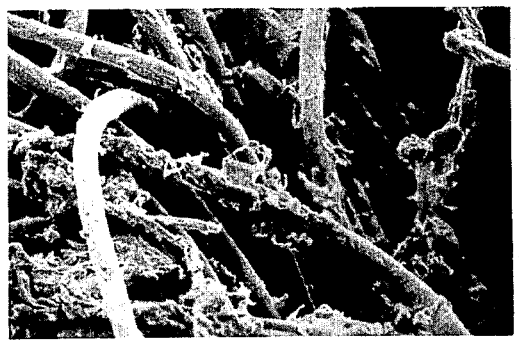

Observation of the fabric revealed that the original control fabric had a soft but tacky surface hand while the fabric which was treated according to the process of the invention had an even, softer but a totally non-tacky surface hand. The appearance of the sample treated according to the invention was also somewhat smoother and more uniform than that of the original sample. Reference to the SEPMs shown in FIG. 49 at 350× shows that there had been a gross accumulation of coagulated polymer present on the surface of the untreated control sample. By contrast the sample which has been treated according to the process of the invention shown in FIG. 50 at 350× reveals that while desirable small islands of the polymer coating are still present, gross accumulations have been substantially removed or broken up. Furthermore, the sample treated according to the invention also exhibits the typical lamella-type protrusions and scarring of the fiber surfaces.

EXAMPLE 14

Mechanical surface treatment according to the present invention was performed on a polyethylene sheet material of 2 mils thickness. The processing conditions are set forth in the attached table.

Figure 51:
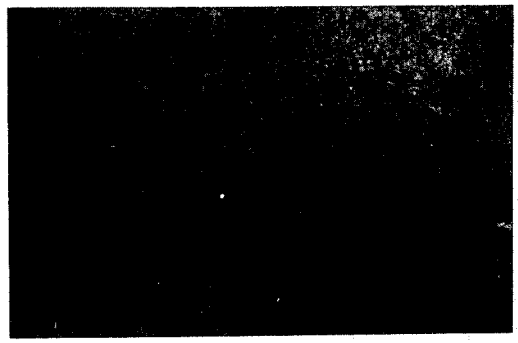
Figure 52:
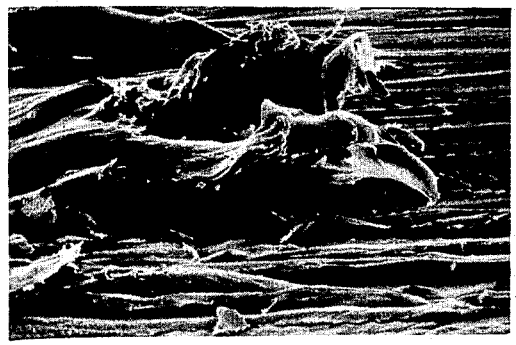

Observation of the sheet material which has been mechanically surface finished revealed that the treatment resulted in converting a substantially transparent film material (the control sample) into a translucent film material with a milky, non-slick surface. SEPMs shown in FIGS. 51 (the control) and 52 (the treated sample) reveal that the treated sample exhibited scratches, striations, lamella-type protrusions and substantial plastic deformation of the surface. Quite similar effects were observed when a nylon film was mechanically surface finished and compared to an untreated nylon film. Substantially the same results were also observed when a polyester film sample was subjected to mechanical surface treatment according to the present invention.

EXAMPLE 15

In this Example, a heavy duty paper (white, light cardboard-type) was subjected to mechanical surface treatment according to the present invention. The paper had a thickness of 11 to 12 mils. Observation of the product after treatment revealed that mechanical surface treatment of the paper resulted in a mat, non-slick surface as compared to the untreated control sample.

TABLE

Fabric Processing Parameters

| Example No. | Fabric Conditions Speed Yd./min. | Tension* lbs. | Passes Face | Passes Back | The Abrasive Roll RPM'S | Speed ft./min. | Direction** | Grit Size | RPM'S | Flap Tip Speed ft./min. | Gap*** in. | The Flap Roll Impact frequency min. | Direction** | Flap Composition width in. | Impingement**** in. | Treatment Stations |
|---|---|---|---|---|---|---|---|---|---|---|---|---|---|---|---|---|
| 1,2 | 5 | 22 | 3 | 1 | 1800 | 1414 | Rev. | 240 | 2380 | 5608 | 1/8 | 19040 | Fwd. | Red Neoprene Rubber 1/16" | 1/8 | 2 |
| 3 | 5 | 22 | 5 | 1 | 1800 | 1414 | Rev. | 240 | 2380 | 5608 | 1/4 | 19040 | Fwd. | Red Neoprene Rubber 1/16" | 1/8 | 2 |
| 4 | 5 | 22 | 1 | 1 | 1250 | 982 | Rev. | 240 | 1710 | 4029 | 3/8 | 6840 | Fwd. | Black Rubber 1/16" | 1/4 | 2 |
| 5 | 20 | 22 | 1 | 1 | 1800 | 1414 | Rev. | 240 | 2380 | 5608 | 1/8 | 19040 | Fwd. | Red Neoprene Rubber 1/16" | 1/4 | 2 |
| 6 | 1.33 | 5 | 1 | 1 | 1210 | 1267 | Fwd. | 240 | 1720 | 3152 | 1/8 | 6880 | Fwd. | Black Rubber 1/16" | 1/8 | 1 |
| 7,8 | 10 | 22 | 1 | 1 | 1800 | 1414 | Fwd. | 240 | 2380 | 5608 | 1/8 | 19040 | Rev. | Red Neoprene Rubber 1/16" | 1/8 | 1 |
| 9 | 35 | 22 | 1 | 1 | 1800 | 1414 | Rev. | 240 | 2380 | 5608 | 1/8 | 19040 | Fwd. | Red Neoprene Rubber 1/16" | 1/4 | 2 |
| 10 | 1.33 | 11 | 2 | 1 | 1210 | 1267 | Fwd. | 320 | 1720 | 3152 | 1/8 | 6880 | Fwd. | Black Rubber 1/16" | 1/8 | 1 |
| 11 | 5 | 22 | 1 | 1 | 1250 | 982 | Rev. | 240 | 1710 | 4029 | 3/8 | 6840 | Fwd. | Red Neoprene Rubber 1/16" | 1/8 | 1 |
| 12 | 10 | 22 | 2 | 1 | 1800 | 1414 | Fwd. | 240 | 2380 | 5608 | 1/8 | 19040 | Rev. | Red Neoprene Rubber 1/16" | 1/4 | 1 |
| 13 | 5 | 22 | 2 | 0 | 1250 | 982 | Rev. | 240 | 1710 | 4029 | 3/8 | 6840 | Fwd. | Black Rubber 1/16" | 1/8 | 2 |
| 14 | 5 | 11 | 1 | 0 | 800 | 838 | Fwd. | 240 | 1710 | 3134 | 1/8 | 6840 | Fwd. | Red Neoprene Rubber 1/16" | 1/8 | 1 |

*Total tension based on entire fabric width.
**Fwd. means that the roll is rotated in the same direction as the fabric movement; Rev. means that the roll is rotated against the direction of fabric movement.
***Refers to gap or distance between fabric in its normal position and the abrasive roll when the fabric is not being impacted.
****Theoretical flap penetration onto abrasive roll when fabric is not present.

What I claim is:

1. A process for mechanically achieving a substantially uniform modification of the hand characteristics of a textile fabric having fibrous components which comprises continuously feeding said fabric from a source of supply such that said fabric lies in a single plane, subjecting successive adjacent sections of said fabric across the width of said fabric to intermittent mechanical impact with at least one rotating abrasive roll thereby avoiding substantial sustained contact between said fabric and said rotating roll; said intermittent mechanical impact being caused by an intermittent impact means disposed across the fabric width, parallel to the abrasive roll near the reverse side of the fabric from said abrasive roll, thereby causing the portions of the fibrous components exposed to said intermittent mechanical impact with said abrasive roll to be substantially scarred and to be provided with a multiplicity of generally short, rather thick lamella shaped protrusions extending therefrom.

2. The process of claim 1, wherein said intermittent impact means comprises a rotatable roll having extending from its perimeter and parallel to its axis across its width at least one strip of flexible material.

3. The process of claim 1 wherein said intermittent impact means comprises at least one rotatable non-circular bar.

4. The process of claim 1, wherein said intermittent impact means comprises an at least one air slot emitting intermittently pressurized air against the reverse side of said fabric from said abrasive means.

5. The process of claim 1, wherein said textile fabric is a polyester-containing fabric.

6. The process of claim 5, wherein said textile fabric is 100 percent polyester fabric.

7. The process of claim 5, wherein said textile fabric is a polyester-cotton blend fabric.

8. A process for mechanically achieving a substantially uniform modification of the hand characteristics of a textile fabric having fibrous components which comprises continuously feeding said fabric from a source of supply such that said fabric lies in a single plane, subjecting successive adjacent sections of said fabric across the width of said fabric to intermittent mechanical impact with at least one rotating abrasive roll thereby avoiding substantial sustained contact between said fabric and said rotating roll; said intermittent mechanical impact being caused by an intermittent impact means disposed across the fabric width, parallel to the abrasive roll near the reverse side of the fabric from said abrasive roll, wherein said abrasive roll is comprised of at least one rotatable roll covered with napping wire, thereby causing the portions of the fibrous components exposed to said intermittent mechanical impact with said abrasive roll to be substantially scarred and to be provided with a multiplicity of generally short, rather thick lamella shaped protrusions extending therefrom.

* * * * *

UNITED STATES PATENT AND TRADEMARK OFFICE
CERTIFICATE OF CORRECTION

PATENT NO. : 4,468,844

DATED : September 4, 1984

INVENTOR(S) : Wolfgang K. F. Otto

It is certified that error appears in the above-identified patent and that said Letters Patent is hereby corrected as shown below: On the title page;

In the Abstract, third line, after "from" delete "an empty" and insert therefor --a--.

Column 3, line 33, change "05" to --0.05--.

Column 5, line 13, before the word "while" insert --even--.

Column 5, line 15, delete the word "non-reinforce" and insert therefor the word --non-reinforced--.

Column 5, line 17, after the word "sheet" insert --materials--.

Column 5, line 22, delete the word "roll" and insert therefor --rolls--.

Column 5, line 26, after the word "distance" insert --between--.

Column 5, line 44, after "13d" insert --and--.

Column 5, line 47, after "the", first instance, insert --abrasive--.

Column 15, line 55, delete "treat ment" and insert therefor --treatment--.

Signed and Sealed this

Ninth Day of July 1985

[SEAL]

Attest:

DONALD J. QUIGG

Attesting Officer     Acting Commissioner of Patents and Trademarks